(12) United States Patent
Hu et al.

(10) Patent No.: US 12,373,363 B2
(45) Date of Patent: Jul. 29, 2025

(54) ADAPTIVE PIPELINE SELECTION FOR ACCELERATING MEMORY COPY OPERATIONS

(71) Applicant: Intel Corporation, Santa Clara, CA (US)

(72) Inventors: Jiayu Hu, Shanghai (CN); Ren Wang, Portland, OR (US); Cunming Liang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 335 days.

(21) Appl. No.: 17/441,668

(22) PCT Filed: Jun. 21, 2019

(86) PCT No.: PCT/CN2019/092226
§ 371 (c)(1),
(2) Date: Sep. 21, 2021

(87) PCT Pub. No.: WO2020/252763
PCT Pub. Date: Dec. 24, 2020

(65) Prior Publication Data
US 2022/0179805 A1    Jun. 9, 2022

(51) Int. Cl.
*G06F 3/06*    (2006.01)
*G06F 9/30*    (2018.01)
(Continued)

(52) U.S. Cl.
CPC ........ *G06F 13/1673* (2013.01); *G06F 9/3004* (2013.01); *G06F 9/30079* (2013.01); *G06F 13/28* (2013.01)

(58) Field of Classification Search
None
See application file for complete search history.

(56) References Cited

U.S. PATENT DOCUMENTS 5,590,313 A * 12/1996 Reynolds .............. G06F 13/102
710/11
6,473,808 B1 * 10/2002 Yeivin ................... G06F 13/387
718/107

(Continued)

FOREIGN PATENT DOCUMENTS

| CN | 101556565 A | 10/2009 |
|----|-------------|---------|
| CN | 107168683 A | 9/2017  |

OTHER PUBLICATIONS

Kim et al., "Data Cache and Direct Memory Access in Programming Media Processors", Aug. 2001, IEEE (Year: 2001).*

(Continued)

*Primary Examiner* — Hyun Nam
(74) *Attorney, Agent, or Firm* — Compass IP Law PC (57) ABSTRACT

Examples include a computing system having a direct memory access (DMA) engine pipeline, a plurality of processing cores, each processing core including a core pipeline, and a memory coupled to the DMA engine pipeline and the plurality of processing cores. The computing system includes a pipeline selector coupled to the plurality of processing cores and the DMA engine pipeline, the pipeline selector to, during initialization, determine at least one threshold for pipeline selection for the computing system, and during runtime, select one of the core pipelines or the DMA engine pipeline to execute a memory copy operation in the memory based at least in part on the at least one threshold.

14 Claims, 9 Drawing Sheets

(51) Int. Cl.
  *G06F 13/16* (2006.01)
  *G06F 13/28* (2006.01)

(56) References Cited

U.S. PATENT DOCUMENTS

| | | | | |
|---|---|---|---|---|
| 7,000,244 | B1* | 2/2006 | Adams | H04N 21/23614 |
| | | | | 348/E5.005 |
| 7,877,524 | B1* | 1/2011 | Annem | G06F 13/28 |
| | | | | 710/22 |
| 7,937,447 | B1* | 5/2011 | Cohen | H04L 67/1097 |
| | | | | 710/33 |
| 8,458,280 | B2* | 6/2013 | Hausauer | H04L 67/1097 |
| | | | | 709/212 |
| 10,884,790 | B1* | 1/2021 | Saidi | G06F 12/1027 |
| 11,436,112 | B1* | 9/2022 | Kumar | G06F 11/2046 |
| 11,630,698 | B2* | 4/2023 | Levin | G06F 9/5011 |
| | | | | 718/101 |
| 2006/0149862 | A1* | 7/2006 | Zaabab | G06F 9/3004 |
| | | | | 710/22 |
| 2009/0006669 | A1* | 1/2009 | Toyama | G06F 13/28 |
| | | | | 710/35 |
| 2009/0172621 | A1* | 7/2009 | Sathe | G06F 30/30 |
| | | | | 716/113 |
| 2010/0005199 | A1* | 1/2010 | Gadgil | G06F 13/28 |
| | | | | 710/22 |
| 2010/0211703 | A1* | 8/2010 | Kasahara | G06F 11/1076 |
| | | | | 711/E12.019 |
| 2011/0004732 | A1* | 1/2011 | Krakirian | G06F 13/28 |
| | | | | 711/147 |
| 2011/0235869 | A1* | 9/2011 | Lu | G06T 17/05 |
| | | | | 382/113 |
| 2014/0173600 | A1 | 6/2014 | Nair | |
| 2017/0046179 | A1* | 2/2017 | Teh | G06F 9/445 |
| 2017/0236053 | A1* | 8/2017 | Lavigueur | G06N 3/063 |
| | | | | 706/31 |
| 2018/0024951 | A1* | 1/2018 | Edmiston | G06F 9/4881 |
| | | | | 718/104 |
| 2018/0089128 | A1* | 3/2018 | Nicol | G06F 13/4221 |
| 2018/0181503 | A1* | 6/2018 | Nicol | G06F 13/1673 |
| 2019/0007280 | A1* | 1/2019 | Sarangam | H04L 47/822 |
| 2019/0013965 | A1* | 1/2019 | Sindhu | H04L 12/4633 |
| 2019/0087218 | A1 | 3/2019 | Loftus et al. | |
| 2019/0188148 | A1 | 6/2019 | Dong | |
| 2019/0327173 | A1* | 10/2019 | Gafni | H04L 47/125 |
| 2022/0179805 | A1* | 6/2022 | Hu | G06F 13/28 |
| 2022/0407740 | A1* | 12/2022 | Cox | H04L 45/745 |
| 2024/0403107 | A1* | 12/2024 | Wang | G06F 9/4818 |
| 2025/0028705 | A1* | 1/2025 | Shi | G06F 7/14 |

OTHER PUBLICATIONS

Harvey et al., "DMA Fundamentals on Various PC Platforms", Apr. 1991, National Instrument (Year: 1991).*

Extended European Search Report for Patent Application No. 19934301.3, Mailed Dec. 19, 2022, 9 pages.

International Search Report and Written Opinion for PCT Patent Application No. PCT/CN19/92226, Mailed Mar. 23, 2020, 10 pages.

* cited by examiner

ADAPTIVE PIPELINE SELECTION FOR ACCELERATING MEMORY COPY OPERATIONS

CLAIM OF PRIORITY

This application is a U.S. National Phase application under 35 U.S.C. § 371 of International Application No. PCT/CN19/92226 filed Jun. 21, 2019, entitled "ADAPTIVE PIPELINE SELECTION FOR ACCELERATING MEMORY COPY OPERATIONS", the entire contents of which are incorporated herein by reference.

BACKGROUND

The field of invention relates generally to memory copy operations in computing systems, and, more specifically, to accelerating memory copy operations by selectively using a processor core pipeline or a direct memory access (DMA) pipeline.

Some processors include a DMA engine that efficiently performs memory copy operations. During a transfer of data by the DMA engine, no processor intervention is needed. Thus, using the DMA engine in scenarios where data movement is heavily involved can potentially not only accelerate performance of memory copy operations, but also save precious processor resources. However, utilizing the DMA engine for optimal system performance is not straightforward. There are several factors, including copy buffer length and number of copy operations, that may significantly impact performance of DMA engine memory copy operations.

In real-world scenarios, the workload characteristics of a virtual machine (VM) and host applications have very high variances. For example, the object lengths in in-memory key-value stores (IMKVs) vary from bytes to megabytes. Some IMKVs workloads may become too small to be suitable for DMA engine acceleration, due to the overhead necessary to set up the memory copy operation. Static processor pipeline and DMA engine pipeline designs can result in severe resource underutilization, resulting in suboptimal performance for the computing system.

DETAILED DESCRIPTION

Embodiments of the present invention provide an adaptive processor core pipeline and DMA engine pipeline design to flexibly select the most appropriate underlying computing hardware to optimally perform memory copy operations for diverse and dynamic workloads according to workload characteristics during runtime.

Before running virtual machines (VMs) and applications (e.g., during initialization of a computing system), embodiments of the present invention determine a plurality of thresholds for the computing system. In an embodiment, the thresholds include a threshold copy length and a threshold number of copy operations. During runtime, embodiments dynamically profile the packet buffer length of each incoming packet and the number of memory copy operations to process in a batch of incoming packets; and based at least in part on this profiling and the thresholds, embodiments select either a processor core pipeline or a DMA engine pipeline to execute the memory copy operations for a portion of the batch of incoming packets.

In embodiments of the present invention, the performance of the DMA engine pipeline is impacted by the packet buffer length to be copied and the number of memory copy operations. In addition, invoking the DMA engine to copy data requires that the processor rings a doorbell and polls the DMA engine's memory mapped Input/Output (I/O) (MMIO) status register to check if the data transfer completes.

In a sample computing system, it was measured that when the packet buffer length is less than or equal to 1,024 bytes, the processor core achieves higher performance for memory copy operations than the DMA engine. The DMA engine outperforms the processor core only after the packet buffer length is greater than 1,024 bytes. When compared with processor cache-to-memory copy operations, the DMA engine shows a similar characteristic. Hence, the packet buffer length must be larger than a first determined threshold if use of the DMA engine for memory copy operations is to achieve higher performance than the processor core. In one embodiment, the first determined threshold (e.g., the threshold copy length is 1,024 bytes). In other computing systems, another value for the threshold copy length may be used.

In some computing systems, it can be measured that when the number of memory copy operations (per batch) is greater than or equal to eight, the DMA engine outperforms the processor core for all packet buffer lengths; in other cases, the processor core achieves higher performance. Therefore, the number of memory copy operations must be larger than a second determined threshold, if use of the DMA engine is to achieve higher performance than the processor core. In one embodiment, the second determined threshold (e.g., the threshold number of copy operations) is eight. In other computing systems, another value for the threshold number of copy operations may be used.

Typically, the workloads running in a VM and in applications have high variance in packet buffer length. For example, in-memory key-value stores (IMKVs) store a variety of key-value objects, such as user account status and media data. Lengths of IMKV objects vary from several bytes to multiple megabytes (from 128 bytes to 1 million bytes (MB) in one example). In some cases, the packets are too small to be suitable for DMA engine acceleration for memory copy operations. Offloading unsuitable workloads to the DMA engine will degrade system performance. Therefore, embodiments of the present invention provide an adaptive processor core and DMA engine pipeline selection process to dynamically allocate workloads to appropriate hardware for efficiently performing memory copy operations.

Figure 1:
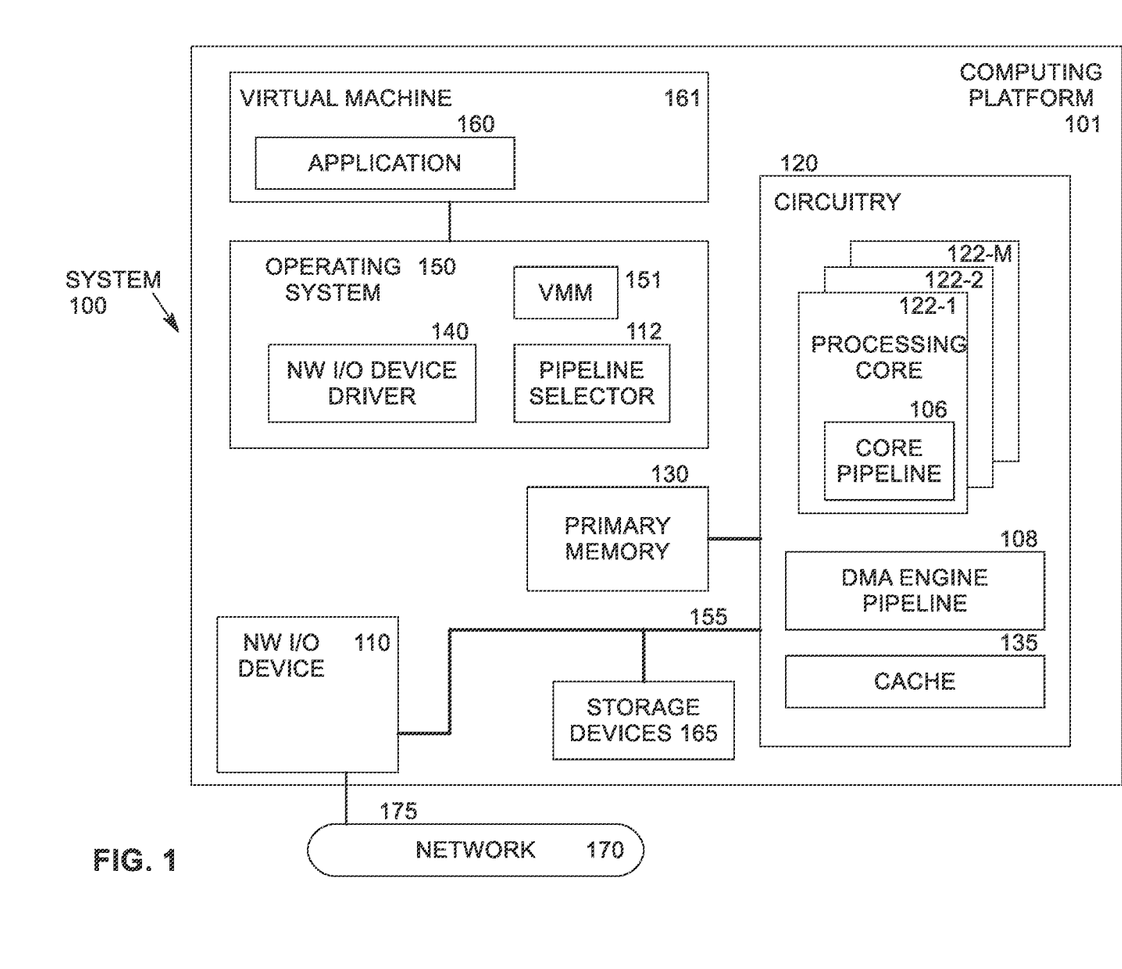
FIG. 1 illustrates an example computing system according to some embodiments.

FIG. 1 illustrates an example computing system 100. As shown in FIG. 1, computing system 100 includes a computing platform 101 coupled to a network 170 (which may be the Internet, for example). In some examples, as shown in FIG. 1, computing platform 101 is coupled to network 170 via network communication channel 175 and through at least one network (NW) input/output (I/O) device 110. In an embodiment, network I/O device 110 comprises a switch, a network interface controller (NIC) having one or more destination ports (not shown) connected or coupled to network communication channel 175. In an embodiment, network communication channel 175 includes a PHY device (not shown). In an embodiment, network I/O device 110 includes an Ethernet NIC. Network I/O device 110 transmits data packets from computing platform 101 over network 170 to other destinations and receives data packets from other destinations for forwarding to computing platform 101.

According to some examples, computing platform 101, as shown in FIG. 1, includes circuitry 120, primary memory 130, operating system (OS) 150, NW I/O device driver 140, virtual machine manager (VMM) (also known as a hypervisor) 151, at least one application 160 running in a virtual machine (VM) 161, pipeline selector 112, and one or more storage devices 165. In one embodiment, OS 150 is Linux™. In another embodiment, OS 150 is Windows® Server. Other OSs may also be used. Network I/O device driver 140 operates to initialize and manage I/O requests performed by network I/O device 110. In an embodiment, packets and/or packet metadata transmitted to network I/O device 110 and/or received from network I/O device 110 are stored in one or more of primary memory 130 and/or storage devices 165. In one embodiment, application 160 is a packet processing application operating in user mode.

In an embodiment, pipeline selector 112 (described further below) is part of the OS. In another embodiment, pipeline selector 112 is part of a memory device driver (not shown). In another embodiment, pipeline selector 112 is implemented in circuitry 120.

In at least one embodiment, storage devices 165 may be one or more of hard disk drives (HDDs) and/or solid-state drives (SSDs). In an embodiment, storage devices 165 may be non-volatile memories (NVMs). In some examples, as shown in FIG. 1, circuitry 120 may communicatively couple to network I/O device 110 via communications link 155. In one embodiment, communications link 155 is a peripheral component interface express (PCIe) bus conforming to version 3.0 or other versions of the PCIe standard published by the PCI Special Interest Group (PCI-SIG).

In some examples, operating system 150, NW I/O device driver 140, pipeline selector 112, VM 161, and application 160 are implemented, at least in part, via cooperation between one or more memory devices included in primary memory 130 (e.g., volatile or non-volatile memory devices), storage devices 165, and elements of circuitry 120 such as processing cores 122-1 to 122-*m*, where "m" is any positive whole integer greater than 2. In an embodiment, OS 150, VMM 151, NW I/O device driver 140, pipeline selector 112, VM 161 and application 160 are executed by one or more processing cores 122-1 to 122-*m*.

In some examples, computing platform 101, includes but is not limited to a server, a server array or server farm, a web server, a network server, an Internet server, a work station, a mini-computer, a main frame computer, a supercomputer, a network appliance, a web appliance, a distributed computing system, multiprocessor systems, processor-based systems, a laptop computer, a tablet computer, a smartphone, a system-on-a-chip (SoC), or a combination thereof. In one example, computing platform 101 is a disaggregated server. A disaggregated server is a server that breaks up components and resources into subsystems (e.g., network sleds). Disaggregated servers can be adapted to changing storage or compute loads as needed without replacing or disrupting an entire server for an extended period of time. A server could, for example, be broken into modular compute, I/O, power and storage modules that can be shared among other nearby servers.

Circuitry 120 having processing cores 122-1 to 122-*m* may include various commercially available processors, including without limitation Intel® Atom®, Celeron®, Core (2) Duo®, Core i3, Core i5, Core i7, Itanium®, Pentium®, Xeon® or Xeon Phi® processors, ARM processors, and similar processors. Circuitry 120 may include at least one cache 135 to store data. In some embodiments, circuitry 120 includes DMA engine pipeline 108 to perform memory copy operations to and from primary memory 130. In some embodiments, each processing core includes a core pipeline 106 to execute instructions, including instructions for memory copy operations to and from primary memory 130.

According to some examples, primary memory 130 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory 130 may include one or more hard disk drives within and/or accessible by computing platform 101.

One example wherein adaptively selecting either the DME engine pipeline 108 or the core pipeline 106 for accelerating memory copy operations is advantageous is when implementing VirtIO as described at www.linux-kvm.org. VirtIO is a standard of paravirtual I/O for VM and host communication. In VirtIO, the host (e.g., OS 150) communicates with VMs 161 by copying packets to and from VM's memory (e.g., a portion of primary memory 130). When enabling TCP Segment Offloading, VMs can use very large TCP packets (such as 64 kilobytes (KB)), to mitigate the per-packet processing overhead. However, the overhead of copying large bulk data in primary memory 130 makes the VirtIO host interface become an I/O bottleneck.

Figure 2:
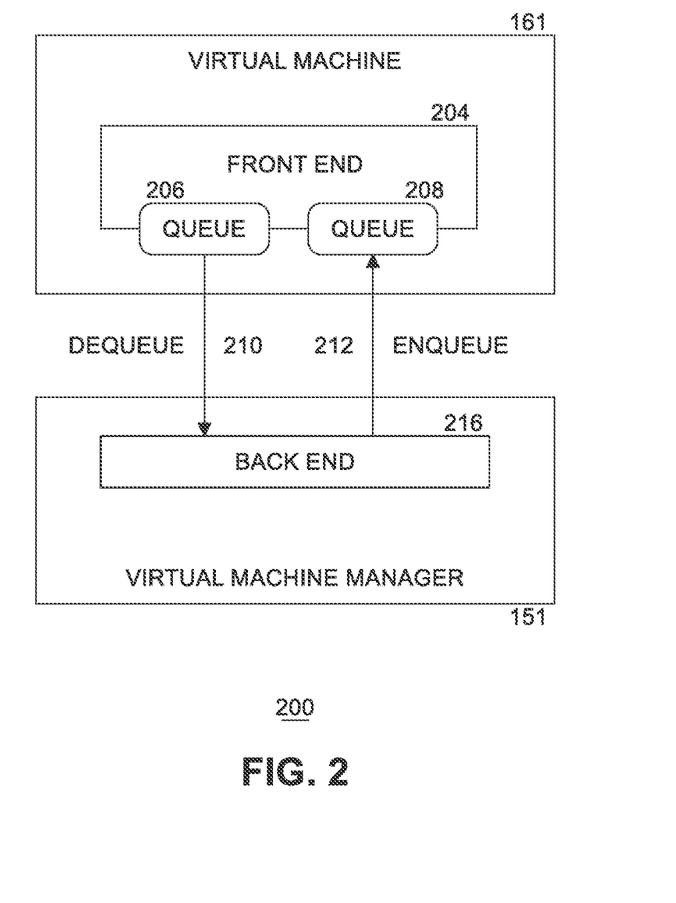
FIG. 2 illustrates an example of a virtual machine interacting with a virtual machine manager according to some embodiments.

FIG. 2 illustrates an example 200 of a virtual machine interacting with a virtual machine manager according to some embodiments. The VirtIO front end 204 in VM 161 and the VirtIO back end 216 in the VMM 151 leverage the VirtIO ring, called virtqueue (shown in FIG. 2 as queues 206, 208), to achieve data exchange. The TX (e.g. dequeue) operation 210 on virtqueue includes front end 204 sending data to back end 216, and the RX (e.g., enqueue) operation 212 on virtqueue includes back end 216 sends data to front end 204. In both TX and RX operations, back end 216 needs to copy packet buffers between the VM's memory and the VMM's memory in primary memory 130.

In VirtIO, every TX/RX operation may generate as many memory copies as the number of passed buffers. In back end 216, processor cycles are used to perform memory copy operations. Furthermore, with enabling TCP Segmentation Offload and user data protocol (UDP) Fragmentation Offload in the VM, TCP/UDP packet lengths are up to 64 KB, which is much larger than the default maximum transmission unit (MTU) size of 1,500 bytes. Therefore, the overhead of copying bulk data makes the VirtIO back end 216 become a networking I/O bottleneck.

Although VirtIO is discussed herein, other virtual devices (such VMXNet3, commercially available from VMWare, Inc., and VMBus, commercially available from Microsoft Corporation) can use the approach of embodiments of the present invention to achieve memory copy acceleration using a DMA engine pipeline.

Figure 3:
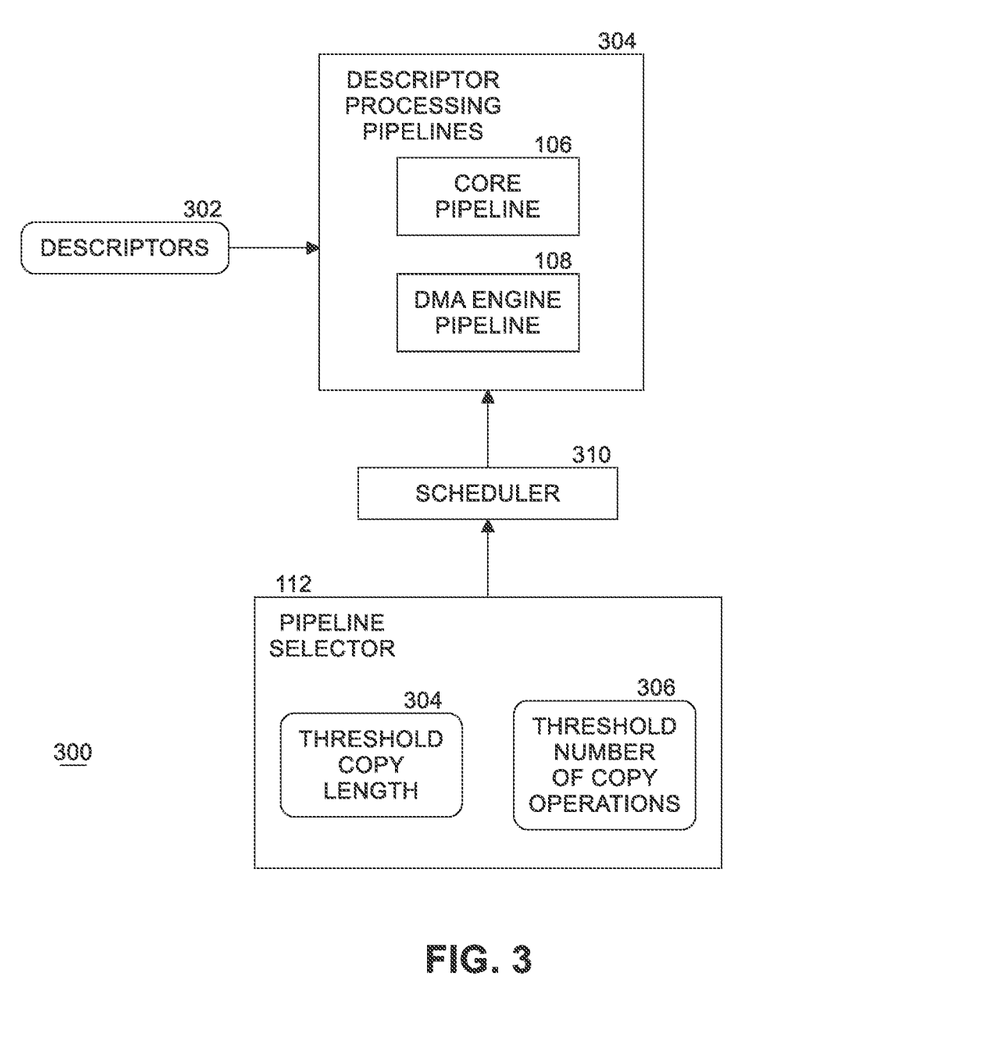
FIG. 3 illustrates an example of an adaptive pipeline selection system according to some embodiments.

FIG. 3 illustrates an example 300 of an adaptive pipeline selector system according to some embodiments. Descriptors 302 are used to describe requests to perform memory copy operations. In an embodiment, each packet of data for purposes of memory copy operations is described by a descriptor. Descriptors are processed by descriptor processing pipelines 304. In an embodiment, descriptor processing pipelines 304 includes at least one core pipeline 106 and at least one DMA engine pipeline 108. Scheduler 310 determines how and when to insert memory copy operations into a selected pipeline. Embodiments of the present invention include pipeline selector 112 to determine which pipeline is to process each descriptor (e.g., resulting in performance of a copy request). When pipeline selector 112 selects core pipeline 106, then core pipeline 106 executes instructions to perform the memory copy operation described by the descriptor. When pipeline selector 112 selects DMA engine pipeline 108, then DMA engine pipeline 108 performs the memory copy operation for the packet described by the descriptor. In some embodiments, descriptors are assembled into batches into the pipelines for increased processing efficiency. Pipeline selector 112 uses the values of threshold copy length 304 and threshold number of copy operations 306, along with values obtained from descriptors 302, to make the pipeline selections for memory copy operations for packets described by descriptors 302.

Figure 4:
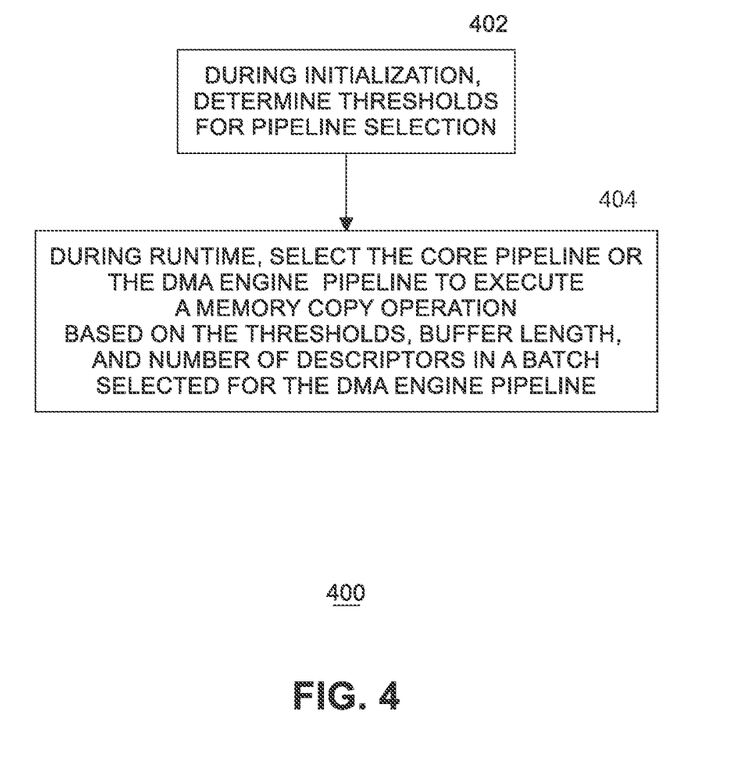
FIG. 4 is a flow diagram of an example process to select a pipeline for memory copy operations according to some embodiments.

FIG. 4 is a flow diagram of an example process 400 to select a pipeline for memory copy operations according to some embodiments. In an embodiment, the actions of FIG. 4 are performed by pipeline selector 112. At block 402, during initialization of computing platform 101, pipeline selector 112 determines the thresholds to be used for pipeline selection. In some embodiments, pipeline selector 112 determines the threshold copy length and the threshold number of copy operations appropriate for computing platform 101. Other thresholds may also be used in other embodiments. In an embodiment, the values of the thresholds are computing platform specific and can be measured on the computing platform before host applications and VMs run. At block 404, during runtime, pipeline selector 112 selects core pipeline 106 or DMA engine pipeline 108 to execute a memory copy operation for a buffer of a packet described by a descriptor based at least in part on the thresholds, the buffer length of the packet, and the number of descriptors in a batch selected for DMA engine pipeline 108. In an embodiment, when a pipeline is selected for each descriptor in a batch of packets, one or more pipelines are executed to perform the requested memory copy operations.

According to embodiments of the present invention, pipeline selection processing is performed in two passes through a batch of descriptors.

Figure 5:
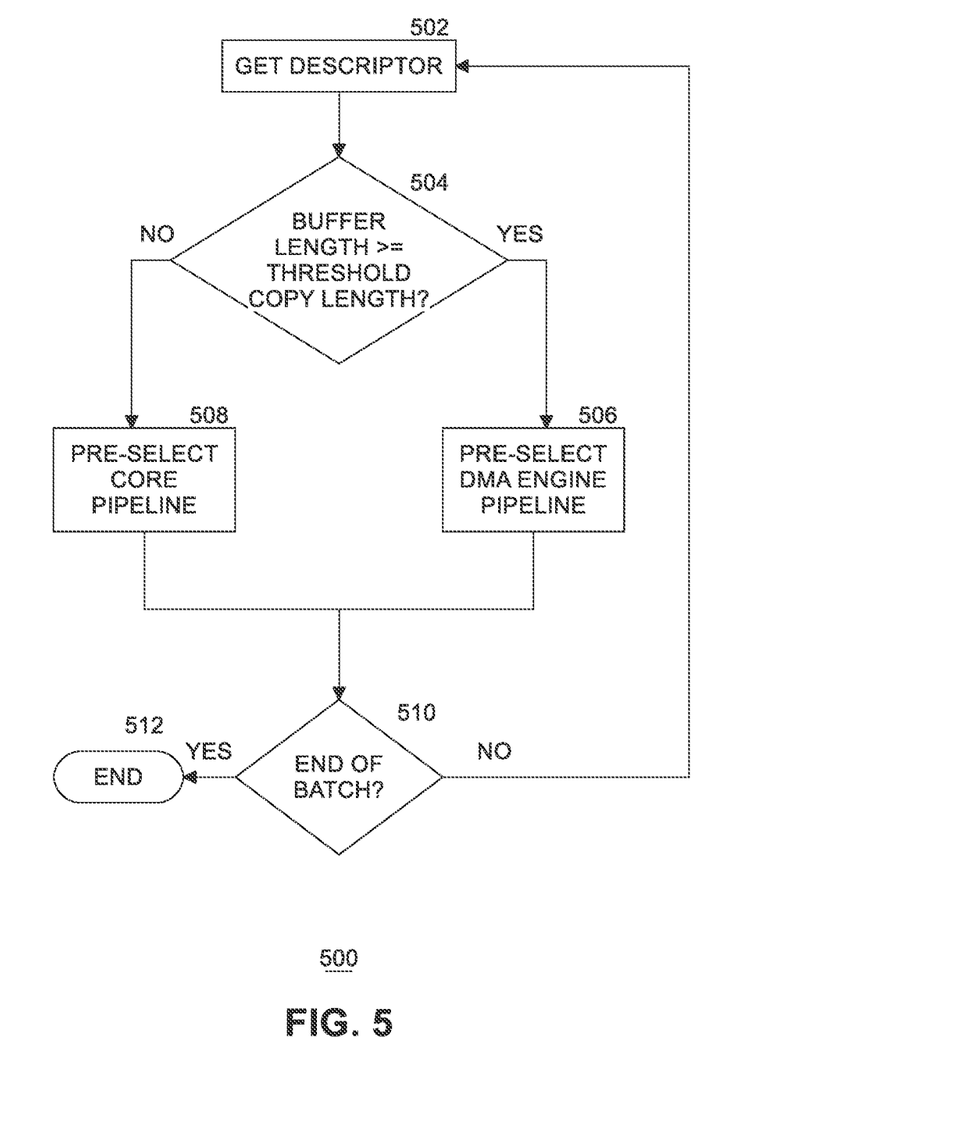
FIG. 5 is a flow diagram of an example of a first pass of processing descriptors for memory copy operations according to some embodiments.

FIG. 5 is a flow diagram of an example 500 of a first pass of processing descriptors for memory copy operations according to some embodiments. In an embodiment, the actions of FIG. 5 are performed by pipeline selector 112. At block 502, a descriptor is obtained from a batch of one or more descriptors. At block 504, if the buffer length of the packet described by the descriptor is greater than or equal to the threshold copy length, then DMA engine pipeline 108 is pre-selected for this descriptor. In an embodiment, a count of the number of descriptors pre-selected for the DMA engine pipeline in this batch is incremented. If the buffer length of the packet described by the descriptor is less than the threshold copy length, then core pipeline 106 is pre-selected for this descriptor. At block 510, if there are more descriptors to be processed in a current batch, then processing continues with the next descriptor at block 502. If this is the end of the batch (e.g., all descriptors of this batch have been processed), then first pass processing ends at block 512. When the first pass is complete there is an initial selection (e.g., a pre-selection) of a pipeline for each descriptor of the batch and a count of the number of descriptors pre-selected for DMA engine pipeline 108.

Figure 6:
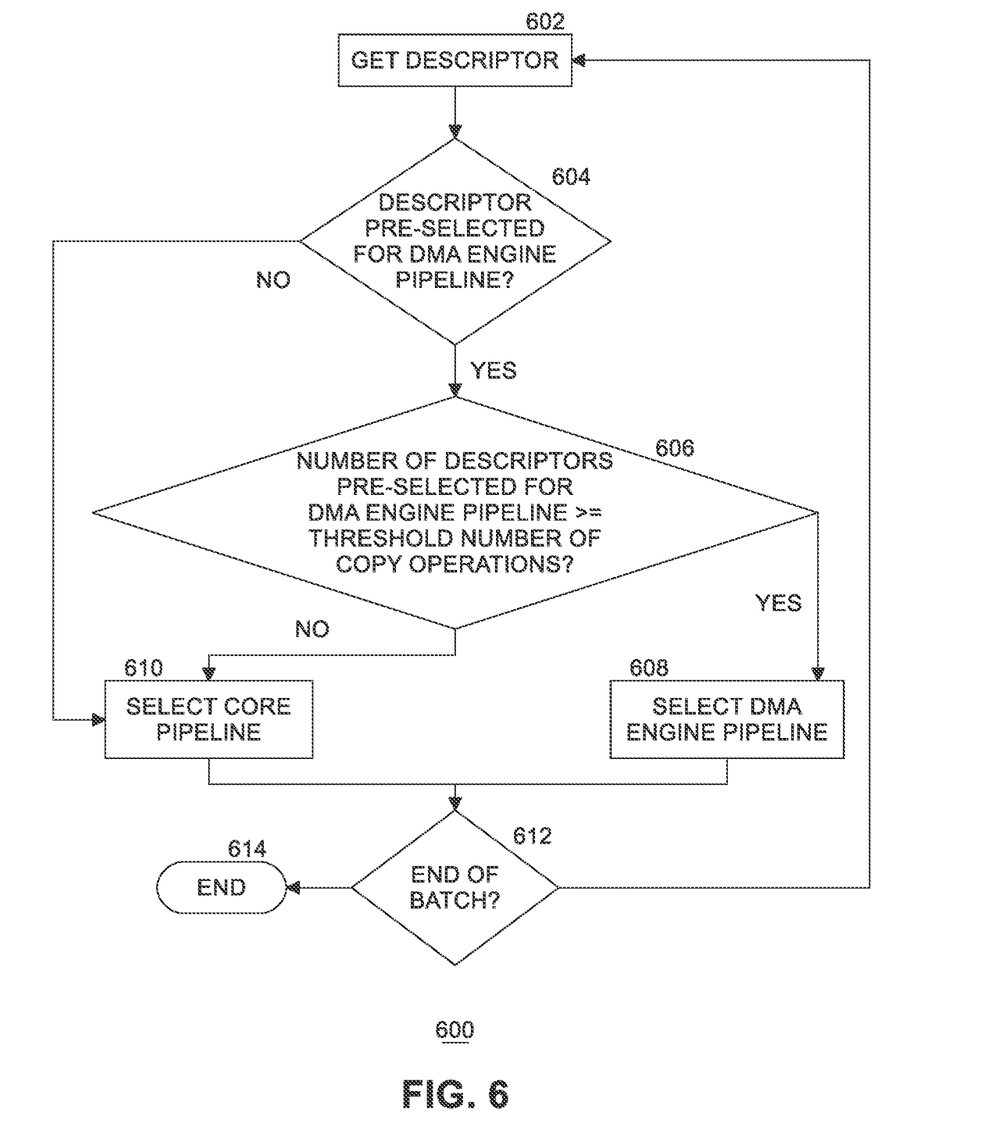
FIG. 6 is a flow diagram of an example of a second pass of processing descriptors for memory copy operations according to some embodiments.

FIG. 6 is a flow diagram of an example 600 of a second pass of processing descriptors for memory copy operations according to some embodiments. In an embodiment, the actions of FIG. 6 are performed by pipeline selector 112. At block 602, a descriptor is obtained from the batch of one or more descriptors. At block 604, if the descriptor has been pre-selected for memory copy operation processing by DMA engine pipeline 108, then processing continues with block 606. At block 606, if the number of descriptors pre-selected for DMA engine pipeline 108 is greater than or equal to threshold number of copy operations 306, then DMA engine pipeline 108 is selected for the descriptor at block 608. At block 604, if the descriptor has not been pre-selected for memory copy operation processing by DMA engine pipeline 108 (e.g., the descriptor was pre-selected for core pipeline 106), then processing continues with block 610. At block 610, core pipeline 106 is selected for the descriptor. At block 606, if the number of descriptors pre-selected for DMA engine pipeline 108 is less than threshold number of copy operations 306, then core pipeline 106 is selected for the descriptor at block 610. Processing after blocks 608 and 610 continue with block 612. At block 612, if there are more descriptors to be processed in the current batch, then processing continues with the next descriptor at block 602. If this is the end of the batch (e.g., all descriptors of this batch have been processed), then second pass processing ends at block 614. All descriptors of the batch have now been assigned to pipelines for execution of the descriptor's memory copy operations.

Figure 7:
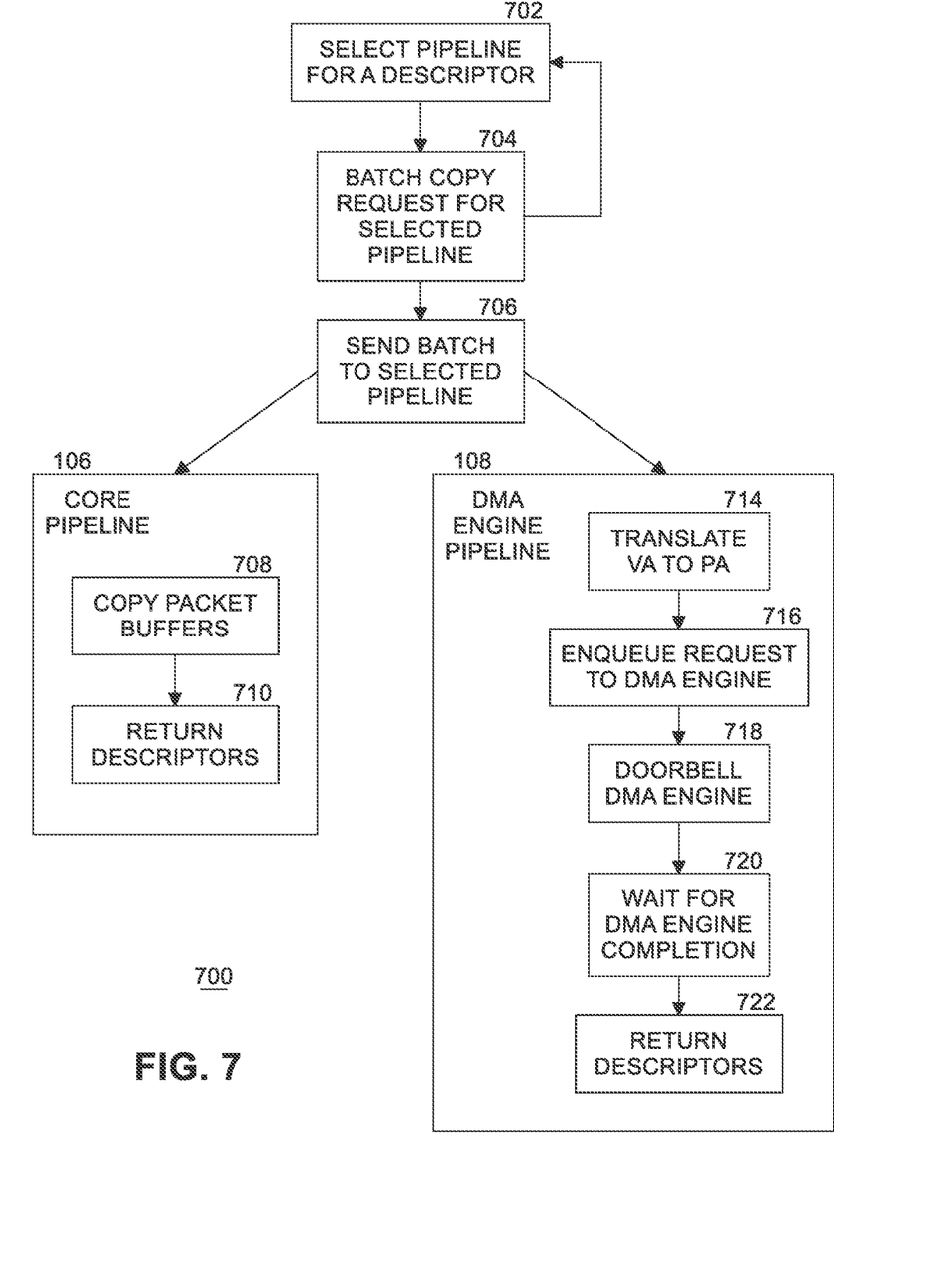
FIG. 7 is a flow diagram of an example of processing memory copy operations according to some embodiments.

FIG. 7 is a flow diagram of an example 700 of processing memory copy operations according to some embodiments. At block 702, pipeline selector 112 selects a pipeline for a descriptor (e.g., as described in FIGS. 4-6). At block 704, pipeline selector 112 batches a copy request for the descriptor for the selected pipeline. Blocks 702 and 704 are repeated for each descriptor in a batch. At block 706, the batch is sent to the selected pipeline. That is, copy requests for descriptors assigned to DMA engine pipeline 108 are sent to the DMA engine pipeline and copy requests for descriptors assigned to core pipeline 106 are sent to the core pipeline. After all incoming descriptors of a batch are processed, the pipelines are executed. For core pipeline 106, at block 708, the core pipeline copies packet buffers according to the descriptors to the virtqueue (in the example of VirtIO). At block 710, the core pipeline returns the descriptors. For DMA engine pipeline 108, processing includes five stages. For each copy request, DMA engine pipeline 108 at block 714 translates the packet buffer's virtual address (VA) into a physical address (PA), since in some embodiments the DMA engine pipeline can only process physical addresses. At block 716, the DMA engine pipeline enqueues the copy request to the descriptor ring of a DMA engine device. At block 718, the DMA engine pipeline invokes the DMA operation to transfer data by ringing a doorbell. After ringing the doorbell, the DMA data transfer and processor core operations can execute concurrently. To mitigate the doorbell overhead, the DMA pipeline repeats blocks 714 and 716 to batch copy requests before ringing a doorbell. If there are unprocessed copy requests, the DMA pipeline repeats blocks 714, 716, and 718 until all of them are assigned to a DMA engine device. At block 720, the processor core waits for the DMA engine pipeline to complete all copy requests. Finally, at block 722 the DMA engine pipeline returns the descriptors to the virtqueue (in the example of VirtIO).

Figure 8:
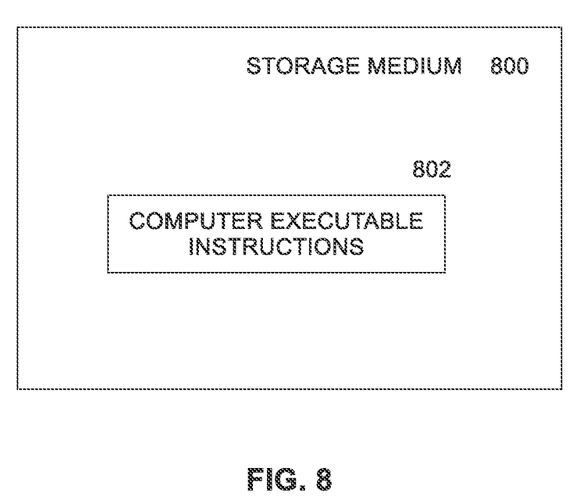
FIG. 8 illustrates an example of a storage medium.

Nom FIG. 8 illustrates an example of a storage medium 800. Storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions 902 to implement logic flows described above in FIGS. 2 through 7. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
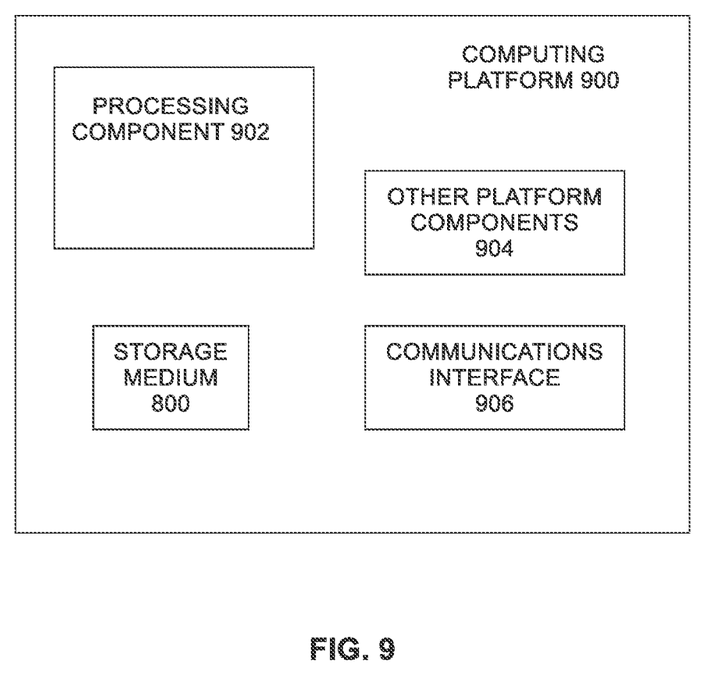
FIG. 9 illustrates another example computing platform.

FIG. 9 illustrates an example computing platform 900. In some examples, as shown in FIG. 9, computing platform 900 may include a processing component 902, other platform components 904 and/or a communications interface 906.

According to some examples, processing component 902 may execute processing operations or logic for instructions stored on storage medium 800. Processing component 902 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 904 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D cross-point memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine-readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 906 may include logic and/or features to support a communication interface. For these examples, communications interface 906 may include one or more communication interfaces that operate according to various communication protocols or standards to communicate over direct or network communication links or channels. Direct communications may occur via use of communication protocols or standards described in one or more industry standards (including progenies and variants) such as those associated with the peripheral component interconnect express (PCIe) specification. Network communications may occur via use of communication protocols or standards such those described in one or more Ethernet standards promulgated by the Institute of Electrical and Electronics Engineers (IEEE). For example, one such Ethernet standard may include IEEE 802.3. Network communication may also occur according to one or more OpenFlow specifications such as the OpenFlow Switch Specification.

The components and features of computing platform 900, including logic represented by the instructions stored on storage medium 800 may be implemented using any combination of discrete circuitry, ASICs, logic gates and/or single chip architectures. Further, the features of computing platform 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples are described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system comprising:
a direct memory access (DMA) engine;
a plurality of processing cores, at least one processing core including a core; and
a circuitry coupled to the plurality of processing cores and the DMA engine, the circuitry to select from (1) at least one of the plurality of processing cores or (2) the DMA engine to execute a memory copy operation based at least in part on at least one of: message length, copy length, or buffer length, wherein:
at least one descriptor is associated with the buffer, for a first memory copy operation, select the at least one of the plurality of processing cores to execute the first memory copy operation based on at least one of: a first message length, a first copy length, or a first buffer length, and for a second memory copy operation, select the DMA engine to execute the second memory copy operation based on at least one of: a second message length, a second copy length, or a second buffer length.

2. The computing system of claim 1, wherein the circuitry is to select one of the plurality of processing cores or the DMA engine to execute a memory copy operation based at least in part on a number of copy operations.

3. The computing system of claim 1, wherein the memory copy operation is for a buffer, the buffer is described by the at least one descriptor, and the at least one descriptor is associated with the buffer length.

4. The computing system of claim 2, wherein the select from (1) the at least one of the plurality of processing cores or (2) the DMA engine to execute the memory copy operation based at least in part on the number of copy operations comprises:

for the at least one descriptor in a batch of buffers:
based on the at least one descriptor is selected for the DMA engine and a number of descriptors selected for the DMA engine is greater than or equal to a number of copy operations, then select the DMA engine to execute the memory copy operation,
based on the at least one descriptor is selected for the one of the plurality of processing cores, then select the one of the plurality of processing cores to execute the memory copy operation, and
based on the number of descriptors selected for the DMA engine is less than the number of copy operations, then select the one of the plurality of processing cores to execute the memory copy operation.

5. The computing system of claim 4, wherein a buffer of the batch of buffers is associated with a packet.

6. A method to be performed by a processor in a computing system, the method comprising:
during initialization of the computing system, determining at least one parameter for device selection for the computing system, and during runtime of the computing system, selecting (1) at least one of a plurality of cores or (2) a Direct Memory Access (DMA) engine to execute a memory copy operation based at least in part on the at least one parameter, wherein:
the at least one parameter comprises one or more of: message length, copy length, or buffer length,
for a first memory copy operation, selecting the at least one of the plurality of cores to execute the first memory copy operation based on at least one parameter associated with the first memory copy operation, and
for a second memory copy operation, selecting the DMA engine to execute the second memory copy operation based on at least one parameter associated with the second memory copy operation.

7. The method of claim 6, wherein the at least one parameter comprises a number of copy operations.

8. The method of claim 6, wherein the memory copy operation is for a buffer, the buffer is described by a descriptor, and the descriptor is associated with the buffer length.

9. The method of claim 8, wherein selecting (1) the at least one of the plurality of cores or (2) the DMA engine to execute the memory copy operation based at least in part on the at least one parameter comprises:

for at least one descriptor in a batch of buffers:
based on the at least one descriptor is selected for the DMA engine and based on a number of descriptors selected for the DMA engine is greater than or equal to a number of copy operations, then selecting the DMA engine to execute the memory copy operation,
based on the at least one descriptor is selected for one of the cores, then selecting one of the cores to execute the memory copy operation, and
based on the number of descriptors selected for the DMA engine is less than the number of copy operations, then selecting one of the cores to execute the memory copy operation.

10. The method of claim 9, wherein the buffer is associated with a packet.

11. At least one tangible non-transitory machine-readable medium comprising a plurality of instructions that in response to being executed by a processor in a computing system, cause the processor to:
during initialization of the computing system, determine at least one parameter for selection for the computing system, and
during runtime of the computing system, select (1) at least one of a plurality of cores or (2) a Direct Memory Access (DMA) engine to execute a memory copy operation based at least in part on the at least one parameter, wherein:
the at least one parameter comprises one or more of: message length, copy length, or buffer length,
for a first memory copy operation, selecting the at least one of the plurality of cores to execute the first memory copy operation based on at least one parameter associated with the first memory copy operation, and
for a second memory copy operation, selecting the DMA engine to execute the second memory copy operation based on at least one parameter associated with the second memory copy operation.

12. The at least one tangible non-transitory machine-readable medium of claim 11, wherein the at least one parameter comprises a number of copy operations.

13. The at least one tangible non-transitory machine-readable medium of claim 11, wherein the memory copy operation is for a buffer, the buffer is described by a descriptor, and the descriptor is associated with the buffer length.

14. The at least one tangible non-transitory machine-readable medium of claim 11, wherein instructions that cause the processor to select one of the cores or the DMA engine to execute the memory copy operation based at least in part on the at least one parameter comprise instructions to:

for at least one descriptor in a batch of buffers: based on the at least one descriptor is selected for the DMA engine and if a number of descriptors selected for the DMA engine is greater than or equal to a number of copy operations, then select the DMA engine to execute the memory copy operation,
based on the at least one descriptor is selected for one of the cores or if the number of descriptors selected for the DMA engine is less than the number of copy operations, then select one of the cores to execute the memory copy operation, and based on the number of descriptors selected for the DMA engine is less than the number of copy operations, then select one of the cores to execute the memory copy operation.

* * * * *